(12) United States Patent
Althen

(10) Patent No.: US 11,326,672 B2
(45) Date of Patent: May 10, 2022

(54) CONTINUOUSLY VARIABLE, NON-FRICTION, DRIVE CHAIN

(71) Applicant: Craig Louis Althen, Bozeman, MT (US)

(72) Inventor: Craig Louis Althen, Bozeman, MT (US)

(*) Notice: Subject to any disclaimer, the term of this patent is extended or adjusted under 35 U.S.C. 154(b) by 125 days.

(21) Appl. No.: 17/029,067

(22) Filed: Sep. 23, 2020

(65) Prior Publication Data
US 2022/0090655 A1    Mar. 24, 2022

(51) Int. Cl.
*F16H 9/24* (2006.01)
*F16G 5/18* (2006.01)
*F16G 5/16* (2006.01)

(52) U.S. Cl.
CPC ............... *F16H 9/24* (2013.01); *F16G 5/16* (2013.01); *F16G 5/18* (2013.01)

(58) Field of Classification Search
CPC ..... F16G 5/00; F16G 5/16; F16G 5/18; F16G 5/20; F16G 1/00; F16G 1/22; F16G 1/24; F16G 1/28; F16G 13/00; F16G 13/02; F16G 13/06; F16G 13/07; F16G 13/08; F16G 13/10; F16G 13/18; F16H 9/04; F16H 9/24
See application file for complete search history.

(56) References Cited

U.S. PATENT DOCUMENTS

| | | | | |
|---|---|---|---|---|
| 675,838 A * | 6/1901 | Capel | ........................ | F16G 5/18 474/240 |
| 893,780 A * | 7/1908 | Butler et al. | .............. | F16G 5/16 474/242 |
| 893,787 A * | 7/1908 | Conklin | .................... | F16G 5/16 474/242 |
| 979,151 A * | 12/1910 | Gits | .......................... | F16G 5/16 305/59 |
| 1,476,603 A * | 12/1923 | Firminger | ................. | F16G 5/18 474/245 |

(Continued)

FOREIGN PATENT DOCUMENTS

| | | | | |
|---|---|---|---|---|
| EP | 0191449 A2 * | 8/1986 | .............. | F16G 5/18 |
| GB | 2416578 A * | 2/2006 | ............. | F16G 13/06 |
| WO | WO-2004000699 A1 * | 12/2003 | ........... | B65G 17/385 |

*Primary Examiner* — Michael R Mansen
*Assistant Examiner* — Raveen J Dias

(57) ABSTRACT

A power transmitting chain that operates between continuously variable pulley sheaves, but which is retained by radial locking forces rather than by teeth, sprockets, strain forces, or tangential friction. The chain is comprised of three basic elements: 1) An inner drive-chain of conventional chain links, which transmits power, but which is free-floating with no contact with the sheaves; 2) an outer series of chocks which immovably wedge into place between the sheave faces; and 3) radial links that are arranged to form the connections between the drive-chain and each of the chocks. The connecting links pivot or swing longitudinally, in both directions at both ends, and are arranged radially, so only radial forces are transmitted between the drive-chain and the chocks. With the primary vectors nearly perpendicular and restricted to angles well below tangency, the chocks are immovably seated and will not slip. However, as the radial links are slightly angled, they also duplicate the necessary horizontal vector components to rotate the sheaves.

2 Claims, 1 Drawing Sheet

(56) References Cited

U.S. PATENT DOCUMENTS

| | | | | |
|---|---|---|---|---|
| 2,353,595 A * | 7/1944 | Shields | F16G 5/18 | 48/102 A |
| 3,098,349 A * | 7/1963 | Waninger | F16L 3/015 | 174/69 |
| 3,861,232 A * | 1/1975 | Bravin | F16H 55/30 | 474/141 |
| 4,303,404 A * | 12/1981 | Moore | F16G 1/24 | 474/242 |
| 4,313,730 A * | 2/1982 | Cole, Jr. | F16H 9/24 | 474/201 |
| 4,650,444 A * | 3/1987 | Sakakibara | F16G 5/18 | 474/201 |
| 4,655,735 A * | 4/1987 | Sakakibara | F16G 5/18 | 474/214 |
| 4,690,665 A * | 9/1987 | Oliver | F16G 5/18 | 474/245 |
| 4,701,153 A * | 10/1987 | Duport | F16G 5/16 | 474/201 |
| 4,755,163 A * | 7/1988 | Kanehira | F16G 13/20 | 474/201 |
| 5,779,583 A * | 7/1998 | Nakatani | F16G 13/20 | 474/146 |
| 5,957,794 A * | 9/1999 | Kerr | F16H 9/24 | 474/122 |
| 6,526,740 B1 * | 3/2003 | Tanemoto | F16G 13/10 | 198/852 |
| 6,592,483 B2 * | 7/2003 | Markley | F16G 5/18 | 474/201 |
| 6,773,297 B2 * | 8/2004 | Komiya | F16G 13/16 | 138/120 |
| 2004/0237498 A1 * | 12/2004 | Komiya | F16G 13/16 | 59/78.1 |
| 2018/0320757 A1 * | 11/2018 | Tetsuka | F16G 13/16 | |
| 2019/0346027 A1 * | 11/2019 | Clopet | F16H 9/24 | |
| 2019/0383365 A1 * | 12/2019 | Clopet | F16H 9/24 | |

\* cited by examiner

CONTINUOUSLY VARIABLE, NON-FRICTION, DRIVE CHAIN

FIELD OF THE INVENTION

The device is a compound chain capable of driving smooth pulley sheaves without reliance on frictional effects.

Some continuously variable transmissions (CVTs) employ chains to transmit power between two adjustable pulleys. As the pulleys allow adjustments in their effective diameters, their effective gear ratios can vary. This disclosure presents a new type of CVT chain, which is used in this conventional manner, but which employs chocks to wedge between the pairs of sheaves. The chocks are joined to a free-floating drive-chain by means of radial links. The radial links pivot at each end, so the drive-chain is only capable of exerting a predominantly downward force on the chocks, which holds them in place. As these forces are largely independent of the usual frictional forces in CVT transmissions, much higher loads can be sustained.

BACKGROUND—PRIOR ART

The inventor is unaware of any prior art involving a branched, compound chain for power transmission between pulley sheaves. However, the art for chain-driven, continuously variable transmissions (CVTs) using smooth, adjustable, conical sheaves is well established. Examples of CVT chains include: U.S. Pat. No. 6,592,483 issued Jul. 15, 2003 to Markey, U.S. Pat. No. 8,104,159 B2 issued Jan. 1, 2012 to Hattori et al., and U.S. Pat. No. 9,746,056 B2 issued on Aug. 29, 2017 to Sassa et al. All of these represent examples of chains developed for CVTs in the automotive industry, but the present disclosure represents a complete and radical departure from such chain designs.

Chain-driven systems that use toothed belts or sprockets may have very high power capacities, but they are not capable of continuously variable outputs. In summary, the prior art systems that are continuously variable have limited power capacities; and, the prior art systems that have high power capacities are not continuously variable. There has been a long-standing need for CVTs of high power capacity for driving industrial equipment and other heavy-duty machinery.

SUMMARY

The continuously variable, non-friction, drive chain (chock-chain) is comprised of three elements. The first element is a drive-chain that transmits the power between the opposing, complementary, smooth-faced, rigid, conical, adjustable sheaves. The drive-chain can be of any proven design as long as it is sufficiently flexible and strong. It must have transverse pins to which the other elements can be attached. The type of chain used with bicycles and motorcycles could suffice, but it would not need the rollers on the pins, and the spaces used for engaging the sprocket teeth could be of arbitrary dimensions. A unique feature of the drive-chain is that it is free-floating, and entirely suspended in the air with no contact with the sheaves.

The second element is comprised of a series of wedge-shaped chocks. There is one chock for each link in the drive-chain. The angles of their lateral faces are identical to those of the sheaves, and this is what provides the wedging action locking them into position. Mathematically, any pair of trajectory lines on opposing sheave faces will converge as long as the angle extends below the angle of tangency. Very shallow angles below tangency converge only slightly, whereas a pair of lines directed towards the very center of the sheave cones will have the steepest convergence. If these lines are extended, they will again diverge—very soon for shallow angles, and more gradually for steeper angles. The largest delay occurs with centrally directed line pairs, which diverge only after transiting the apices of the cones.

The third element is a series of radial links that connect each chock to its corresponding link on the drive-chain. These radial links are oriented more or less vertically, or perpendicularly, like wheel spokes, and they are connected to both the drive-chain and the chocks by means of swinging, pivoting joints at each end. The drive-chain forms an inner loop, and the radial links support an ordered array of chocks around the outer periphery.

This new, composite chain (chock-chain) does not rely on friction or shear forces, is non-directional, requires lubrication, but no specially-formulated CVT lubricants, and requires no clamping pressure from the sheaves. As the retaining forces do not rely on friction, it will not slip. Like sprocket or toothed chains, it will break before it will fail from slipping. Subsequent sections will detail further objects and advantages. Experts will think of other advantages inherent in the overall design.

BRIEF DESCRIPTION OF THE DRAWINGS

The features of the present invention, which are believed to be novel, are set forth with particularity in the appended claims. The invention, together with further objects and advantages thereof, may best be understood by reference to the following descriptions taken in conjunction with the accompanying drawings.

NUMERICAL REFERENCES FOR FIGURES

1 Chock
   11 Lateral face of chock
   12 Contact boss
   13 Mating face
   14 Hole for a chock pin
2 Radial link
   21 Chock pin
   22 Chain pin
3 Drive-chain
   31 Drive-chain link
4 Sheave
5 Complete Chock-chain

DETAILED DESCRIPTION OF THE DRAWINGS AND OPERATION

Figure 1:
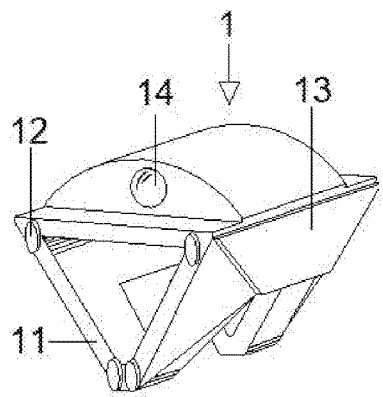
FIG. 1 Chock.

FIG. 1 shows a sample chock (1). The use of wedges or chocks as locking mechanisms dates back to ancient Greek times, and these function in the usual way. The angle of a lateral face (11) exactly matches the angle of the inner face of a sheave (4). The chocks (1) can be of a great variety of shapes—tall and thin, short and wide, angular or round in cross-section, and so forth. A key feature is that, in accommodating the variably curved surface of the conical sheaves (4), only the extremities or corners wedge in place.

A contact boss (12) is shown at each upper corner, and a pair of bosses (12) is shown near the base spaced more closely together. The bottom pair (and their corners) could be more spread apart. The contact bosses (12) are not strictly needed for light-duty applications. However, in such cases, the lateral faces (11) would have to be slightly concave so that the contact areas would be restricted to the corners. The corners themselves could be flattened or extremely shallowly concave in order to achieve asymptotic contact. Three contact bosses (12) form a very stable arrangement (as in the legs of a milkmaid's stool). FIG. 1 shows four contact bosses (12), which is desirable, but these are disposed in an arrangement approximating a stable triangle.

Mathematically, each contact boss (12) only makes (radial) linear contact with the face of a sheave (4). In reality, the sheave (4) faces, and those of the chock's lateral faces (11), approach flat surfaces as incrementally smaller sections are examined. A similar situation is also observed in spur gears, and the contact surfaces are elastic enough to form elongated, 2-dimensional surfaces. Fortunately in this case, both the sheaves (4) and chocks (1) are far less curved and far more flattened than with spur gears. The detailed surface shape of the contact bosses (12) will depend, in part, upon the overall size of the machinery and the application. For large, heavy-duty applications, the contact bosses (12) could be pivoting. For applications in which the final, operating speed ratio is largely fixed, the surface curvature of the contact bosses (12) could exactly match that of the surface of the sheave (4) for that specific gear ratio. Modern exotic materials will be useful in perfecting the contact surfaces of both the sheaves (4) and the chocks (1).

One important mitigating fact stands out. Namely, despite the possible extensive wear in the contact bosses (12), perhaps up to 90 percent, it will not affect their functioning. Small adjustments in the sheaves (4) can continuously restore positioning and provide the same pull and all of the same gear ratios as always.

Both longitudinal faces of the chocks (1) have an extended area forming a mating face (13). These are important for maintaining the upright orientation of the serial chocks (1) when they are not wedged in the pulley sheaves (4). A hole for a chock pin (14) is shown in the upper portion of the chock (1). This could also be positioned nearer the middle or in the lower part of the chock (1). While there is considerable latitude in the shapes and proportions used for the various elements, some care must be exercised in locating the chock pin (21). Its relative height will influence the angles and therefore the directions and strengths of the tension vectors between the chocks (1) and a drive-chain (3). Steep angles increase tension via an inverse sine function, which means in extreme cases the forces on the radial links (2) can be very high. The radial links (2) can only transmit forces along their lengths. So absolutely perpendicular alignments to the drive-chain (3) cannot provide a horizontal component of force to or from the sheaves (4). Shallower angles reduce tension, but risk providing an angle too close to tangency, which would allow slippage. In any case, a chock pin (21) provides the pivoting or pendulum-like action necessary for the operation of the completed structure.

Figure 2:
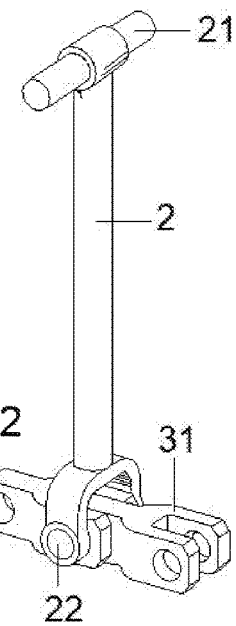
FIG. 2 Radial link.

FIG. 2 shows a radial link (2) and a pair of chain links (31) from a small section of the drive-chain (3). Each radial link (2) is suspended peripherally by a chock pin (21), and is connected centrally to the drive-chain (3) through a chain pin (22). Both pins are short, transverse shafts. The chain pin (22) may be an external extension from a solid chain link (31) as shown here. Or, the drive-chain (3) can provide internal connections as shown in the remaining drawings. Both ends of the radial link (2) must be able to swing longitudinally in both directions.

The angles and forces experienced by the chocks (1) mentioned above are not an issue, even with significant departures in the geometry from the very limited examples shown in the drawings. On the highly tensioned side of the loop, the drive-chain (3) bears all of the tension while in-between the pulleys, and the radial links (2) and chocks (1) are free. As the chocks (1) load onto the driving pair of sheaves (4), they are immediately pulled down and back. That stress is transmitted through the radial links (2) and is relieved by the swinging of the radial links (2) and a slight lifting of the drive-chain (3). As the chocks (1) continue to move around the arc of the rotating sheave (4), the angles are reduced. By the time they reach or pass the halfway point, the radial links (2) approach angles very close to vertical, and these chocks (1) are very securely locked into position. If these chocks (1) are immovable, then all of the other linked chocks (1) are also immovable regardless of their instantaneous vector angles. The angles and vectors experienced by the radial links (2) and chocks (1) on the driven sheaves (4) are the mirror image of those on the driver sheaves (4).

Figure 3:
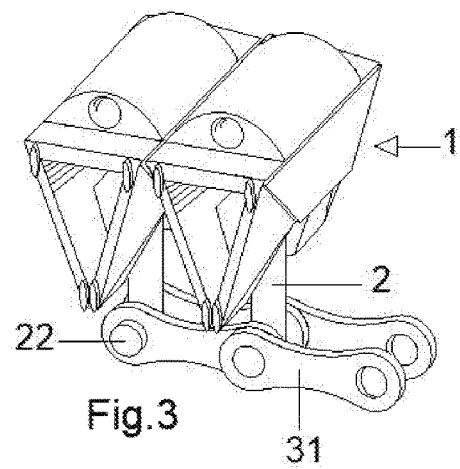
FIG. 3 Short segment of a completed chock-chain.

FIG. 3 shows a short segment of a completed chock-chain (5). Note that the drive-chain (3) itself is reminiscent of old technology—just as is the chock (1). The unusual feature is the use of a drive-chain (3) that does not connect to any driven members. The chain is free-floating and suspended in air. Two subunits, the radial links (2) and the chocks (1) are interposed to transmit the pulling forces.

The drive-chain (3) can take numerous forms as long as it is flexible, has high tensile strength, and has good torsional stability. A torsionally stiff belt could be used, if it provided the equivalent of chain pins (22). Cables are not recommended even if used in pairs and bridged with chain pins (22) due to torsional instability.

Figure 4:
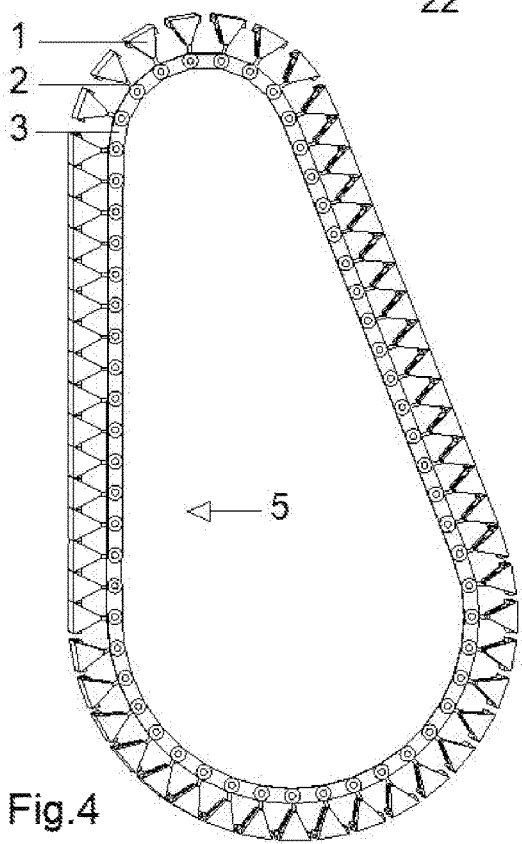
FIG. 4 "Schematic" (side) view of chock-chain.

FIG. 4 shows a schematic (side) view of the completed, endless loop of the chock-chain (5). It is composed of the three basic elements: chocks (1), radial links (2), and drive-chain (3).

Figure 5:
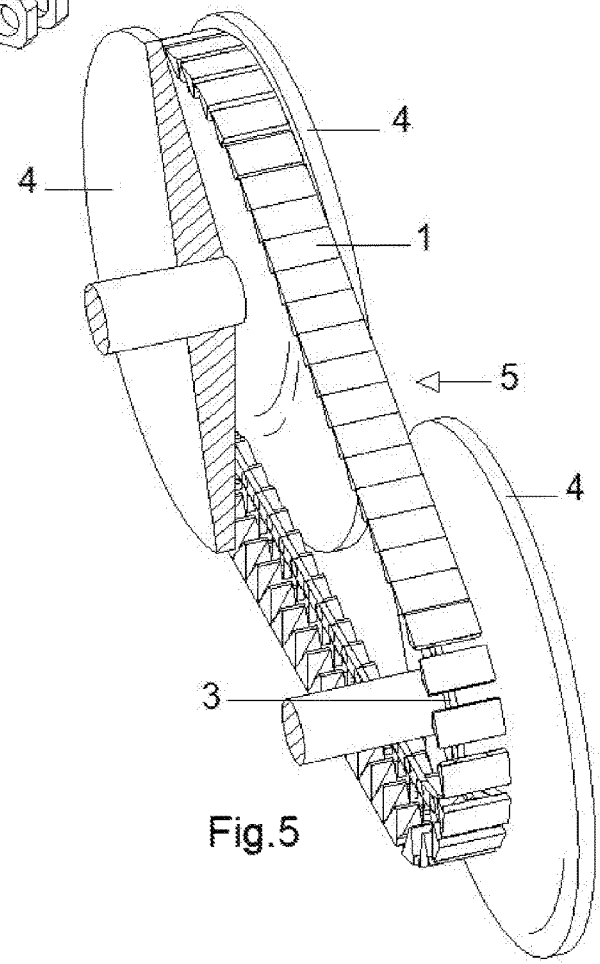
FIG. 5 "Schematic" (end) view of chock-chain with pulley sheaves.

FIG. 5 provides a schematic (end) view with the inclusion of a pair of pulley sheaves (4). Either pair of sheaves could provide the input or output (i.e., be the driver or the driven pair).

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

I claim:

1. A closed loop for transferring rotational power between smooth-faced, conical pulley sheaves, said closed loop comprising:
   a. a flexible, free-floating drive-chain having
   b. a plurality of peripherally arranged wedge-shaped chocks with each chock connected to said drive-chain with
   c. a corresponding radially disposed link, with each said radially disposed link having longitudinal pivoting capability, forwards and backwards, at connecting points to both said drive-chain and to said corresponding chocks;
   said chocks having dimensional and angular compatibility with said smooth-faced conical pulley sheaves to provide a locking action when centripetally forced into and between said smooth-faced conical pulley sheaves; whereby said locking action allows said chocks to transmit power, to and from said smooth-faced conical pulley sheaves to said drive-chain via said radially disposed links.

2. A closed loop as set forth in claim 1 in which all lateral faces of said chocks having designated contact areas arranged peripherally about extremities of said lateral faces and having geometric parameters to assure compatibility and said locking action with said smooth-faced conical pulley sheaves.

\* \* \* \* \*